United States Patent
Ito et al.

(10) Patent No.: US 7,991,982 B2
(45) Date of Patent: Aug. 2, 2011

(54) MICROCOMPUTER AND ENCODING SYSTEM FOR EXECUTING PERIPHERAL FUNCTION INSTRUCTIONS

(75) Inventors: Naoki Ito, Nukata-gun (JP); Masahiro Kamiya, Nishio (JP); Hideaki Ishihara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/585,781

(22) Filed: Sep. 24, 2009

(65) Prior Publication Data

US 2010/0017585 A1   Jan. 21, 2010

Related U.S. Application Data

(62) Division of application No. 11/330,237, filed on Jan. 12, 2006, now Pat. No. 7,664,933.

(30) Foreign Application Priority Data

Jan. 17, 2005  (JP) .................................. 2005-009413
Aug. 31, 2005  (JP) .................................. 2005-251317

(51) Int. Cl.
  *G06F 9/44*  (2006.01)
(52) U.S. Cl. ...................................................... 712/225
(58) Field of Classification Search .................. None
  See application file for complete search history.

(56) References Cited

U.S. PATENT DOCUMENTS

| | | | |
|---|---|---|---|
| 5,922,067 A | 7/1999 | Nakayama | |
| 6,032,252 A * | 2/2000 | Petro et al. ................... | 712/233 |
| 6,205,540 B1 | 3/2001 | Grieb et al. | |
| 6,304,957 B1 | 10/2001 | Ishihara et al. | |
| 6,912,649 B2 | 6/2005 | Luick | |
| 6,957,321 B2 | 10/2005 | Sheaffer | |

(Continued)

FOREIGN PATENT DOCUMENTS

JP  A-55-59551  5/1980
JP  A-2004-038521  2/2004

OTHER PUBLICATIONS

Notice of Reason for Refusal issued from the Japanese Patent Office on Feb. 2, 2010 in the corresponding Japanese patent application No. 2005-251317 (with English translation thereof).
Hennessy, John L., et al., "Computer Organization and Design: The Hardware/Software Interface," Morgan Kaufmann Publishers, Inc., Second Edition, 1998, pp. 478 and 485.

*Primary Examiner* — Jacob Petranek
(74) *Attorney, Agent, or Firm* — Posz Law Group, PLC

(57) ABSTRACT

A microcomputer that can process plural tasks time-divisionally and in parallel, wherein one of a plural programs described by one of the tasks is described as a looped specific task in which the increment of program addresses is fixed, a program counter is usable as a timer counter, a peripheral function instruction is described in the specific task, the peripheral function instruction is set so as to indicate one or more general-purpose registers as an operand. The CPU executes the peripheral function instruction as one instruction and achieves information needed to execute the instruction by a general-purpose register and stores the execution result into the general-purpose registers. An instruction code encoding system includes an operation code and plural operands for indicating operation targets of an instruction in an instruction code and executing an instruction indicated by the operation code on the operation targets. When the operation targets indicated by the plural operands are set to a combination in which an execution result does not vary, the processing corresponding to an instruction different is executed.

3 Claims, 18 Drawing Sheets

U.S. PATENT DOCUMENTS

2002/0087842 A1 7/2002 Smith
2002/0178349 A1* 11/2002 Shibayama et al. .......... 712/235
2006/0026411 A1* 2/2006 Yoshida ........................ 712/241
2006/0161763 A1 7/2006 Ito et al.

* cited by examiner

FIG. 3B

```
○FILTER ALLOWANCE                    /*----FILTER PROCESSING----*/
  if((Rm15^Rm14)==1){                /* PRES. AND PREVI.TER. STATES ARE
    Rm14 = Rm15                         NON-COINCIDENT WITH EACH OTHER */
  }else{
                                     /* PRES. AND PREVI.TER. STATES ARE
○FILTER PROHIBITION                     COINCIDENT WITH EACH OTHER */
  Rm14 = Rm15                        /*----EDGE JUDGMENT----*/
    if((Rm15^Rm13) == 0){            /** NO EDGE EXISTS */
      Rm13 = Rm15
    }else{                           /* EDGE EXISTS */
      Rm13 = Rm15
      if(EDGE CON. IS SAT.){
        Rm7:0 = PC
        Rm8 = 1
      }
    }
  }
}
```

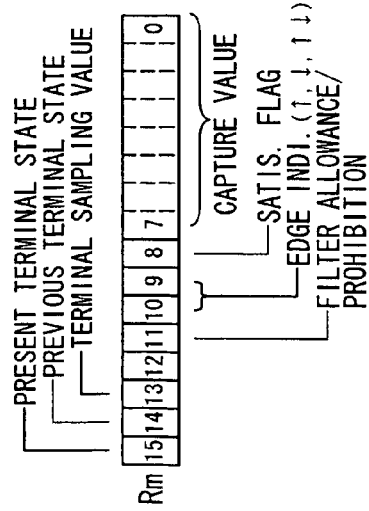

- PRESENT TERMINAL STATE
- PREVIOUS TERMINAL STATE
- TERMINAL SAMPLING VALUE
- CAPTURE VALUE
- SATIS. FLAG
- EDGE INDI. (↑,↓,↑↓)
- FILTER ALLOWANCE/PROHIBITION

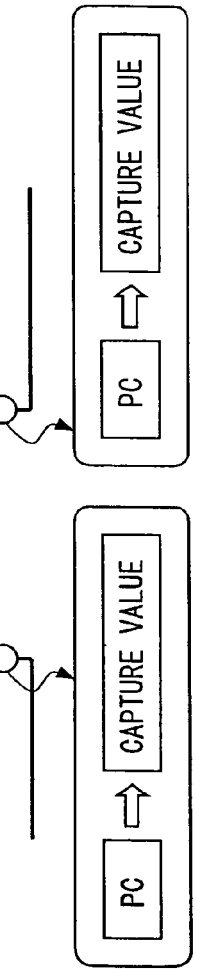

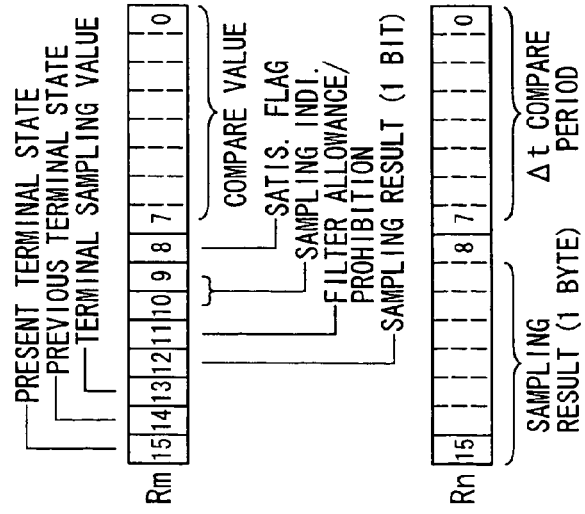

FIG. 4B

```
○FILTER PROCESSING                        /*----FILTER PROCESSING----*/
  if((Rm15^Rm14)==1){                     /* PRES. AND PREVI.TER. STATES ARE
    Rm14 = Rm15                              NON-COINCIDENT WITH EACH OTHER */
  }else{                                  /* PRES. AND PREVI.TER. STATES ARE
○FILTER PROHIBITION                          COINCIDENT WITH EACH OTHER */
    Rm14 = Rm15
    Rm13 = Rm15 if(PC >= Rm7:0){
    Rm7:0 += Rn7:0
    Rm8 = 1
    switch(Rm10:9){
       Case 00b : Rm12 = Rm13    /* 1 BIT SAMPLING */
       Case 01b : ----           /** NO SAMPLING */
       Case 10b : Rn15:8 <<= 1   /* BYTE SAMPLING LEFT SHIFT */
                  Rn8 = Rm13
       Case 11b : Rn15:8 >>= 1   /* BYTE SAMPLING RIGHT SHIFT */
                  Rn15 = Rm13
    }
  }
}
```

FIG. 4C

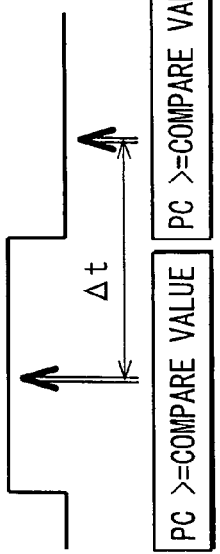

FIG. 5B
```
if(PC >= Rm7:0) {
    Rm7:0 += Rn7:0
    Rm8 = 1
    switch(Rm11:9){
        Case 000b :  ―――          /* NO OUTPUT */
        Case 001b :  Rm15 = 0     /* "L"OUTPUT */
        Case 010b :  Rm15 = 1     /* "H"OUTPUT */
        Case 011b :  Rm15 ^= 1    /* INVERSION OUTPUT */
        Case 100b :  ―――          /* NO OUTPUT */
        Case 101b :  ―――          /* NO OUTPUT */
        Case 110b :  Rm15 = Rn8
                     Rn15:8 = Rn15 >>= 1   /* BYTE OUTPUT RIGHT SHIFT */
        Case 111b :  Rm15 = Rn15
                     Rn15:8 = Rn15 <<= 1   /* BYTE OUTPUT LEFT SHIFT */
    }
}
```
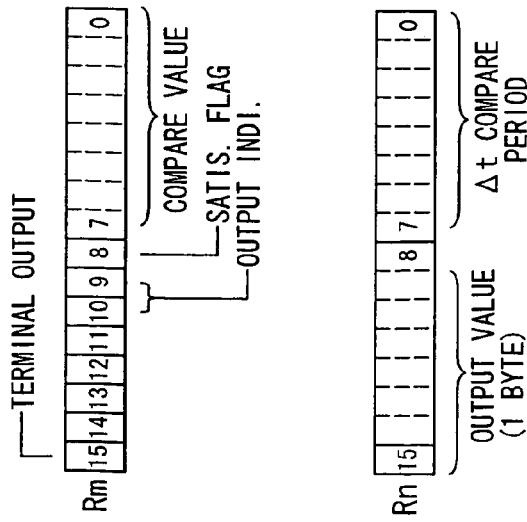
FIG. 5A
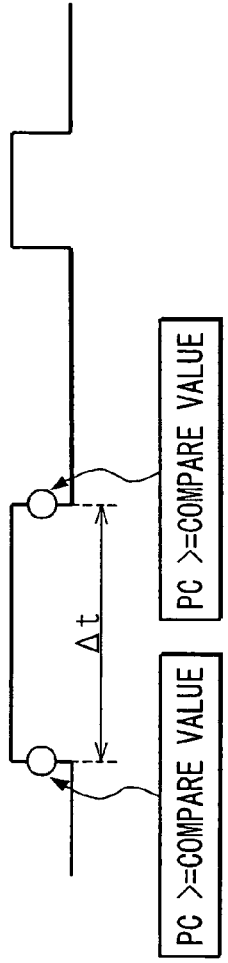
FIG. 5C

FIG. 6A

```
Rm |15|14|13|12|11|10| 9 | 8 | 7 |   |   |   |   |   |   | 0 |
     │  │  │  │  └──┬──┘ └─────────────┬─────────────────┘
     │  │  │  │     │                  └─ TERMINAL SAMPLING VALUE
     │  │  │  │     └─ Δt (COMPARE SET VALUE)
     │  │  │  └─ SATIS. FLAG
     │  │  └─ EDGE INDI. (↑,↓,↑↓)
     │  └─ FILTER ALLOWANCE/PROHIBITION
     │  ─ PREVIOUS TERMINAL STATE
     └─ PRESENT TERMINAL STATE

Rn |15|   |   |   |   |   |   | 8 | 7 |   |   |   |   |   |   | 0 |
                                 └─────────────── COMPARE VALUE ──┘
```

FIG. 6B

```
○FILTER ALLOWANCE                   /*----FILTER PROCESSING----*/
 if((Rm15^Rm14)==1){                /* PRES. AND PREVI.TER. STATES ARE
    Rm14 = Rm15                        NON-COINCIDENT WITH EACH OTHER */
 }else{                              /* PRES. AND PREVI.TER. STATES ARE
○FILTER PROHIBITION                     COINCIDENT WITH EACH OTHER */
    Rm14 = Rm15 if((Rm15^Rm13) == 0){           /*----EDGE JUDGMENT----*/
       Rm13 = Rm15                  /* NO EDGE EXISTS */
    }else{
       R13 = Rm15                   /* EDGE EXISTS */
       if(EDGE CON. IS SAT.){
          Rn7:0 = (PC + Rm7:0)
          Rm8 = 1
       }
    }
 }
```

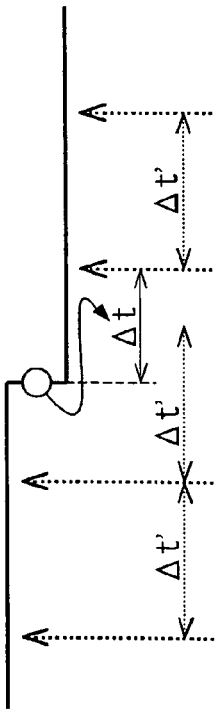

Rm |15|14|13|12|11|10|9|8|7| | | | | | |0|
- PRESENT TERMINAL STATE
- PREVIOUS TERMINAL STATE
- TERMINAL SAMPLING VALUE
- SAMPLING RESULT (1 BYTE)
- SATIS. FLAG
- SAMPLING INDI.
- FILTER ALLOWANCE/PROHIBITION
- SAMPLING RESULT (1 BIT)

Rn |15|14|13|12|11|10|9|8|7|6|5|4|3|2|1|0|
- CONDITION FLAG

FIG. 7B

```
if(Rn8 == 1){      [FILTER PROCESSING] + [SAMPLING PROCESSING]
}else{             [FILTER PROCESSING]
}
                                                    /*----FILTER PROCESSING----*/
◆FILTER PROCESSING
 ○FILTER ALLOWANCE                                  /* PRES. AND PREVI.TER. STATES ARE
  if((Rm15^Rm14)==1){                                 NON-COINCIDENT WITH EACH OTHER */
   Rm14 = Rm15
  }else{                                            /* PRES. AND PREVI. TER. STATES ARE
   Rm14 = Rm15                                        COINCIDENT WITH EACH OTHER */
   Rm13 = Rm15
  }
 ○FILTER PROHIBITION
   Rm14 = Rm15
   Rm13 = Rm15
◆SAMPLING PROCESSING
  Rm8 = 1
  switch(Rm10:9){
   Case 00b : Rm12 = Rm13  /* 1 BIT SAMPLING */
   Case 01b : ―――――         /* NO SAMPLING */
   Case 10b : Rm7:0 <<=1    /* BYTE SAMPLING LEFT SHIFT */
              Rm0 = Rm13
   Case 11b : Rm7:0 >>=1    /* BYTE SAMPLING RIGHT SHIFT */
              Rm7 = Rm13
  }
}
```

FIG. 7C

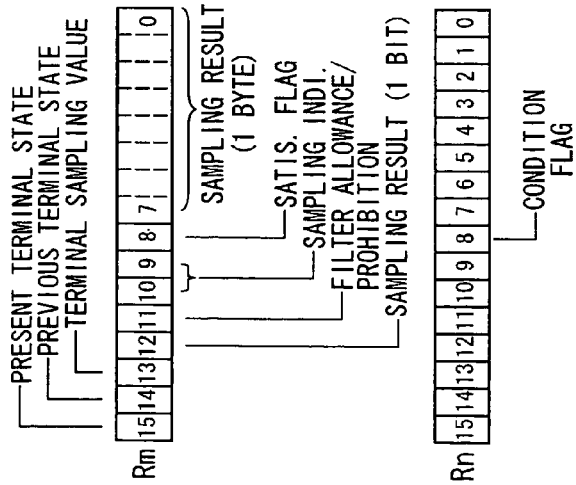

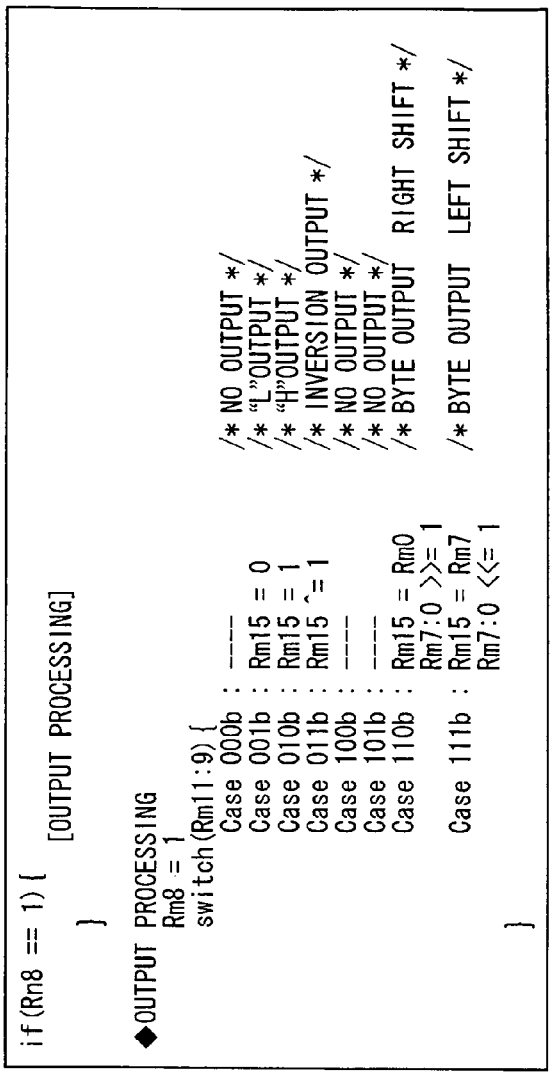
FIG. 8A
FIG. 8B
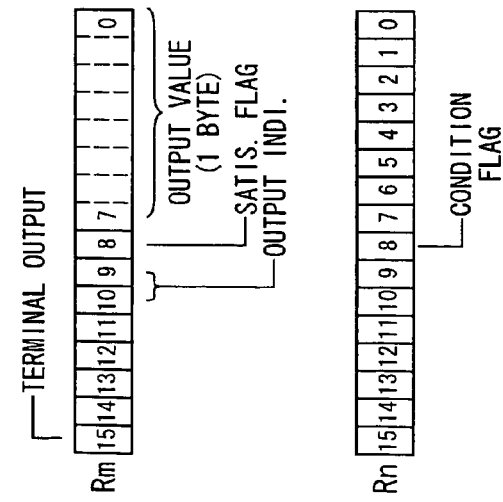
FIG. 8C

Δt

<FUNCTION>
· SAMPLE TERMINAL AFTER Δt FROM DETECTION OF EDGE
· DETECTION OF RISING EDGE, DETECTION OF FALLING EDGE, DETECTION OF BOTH THE EDGES

<IMPLEMENTATION BY PERIPHERAL INSTRUCTION>
· INPUT COMPARE SET INSTRUCTION ···DETECT EDGE OF TERMINAL AND SET COMPARE PERIOD
· SAMPLING COMPARE ···SAMPLE TERMINAL AT THE TIME OF PC COINCIDENCE

FIG. 13

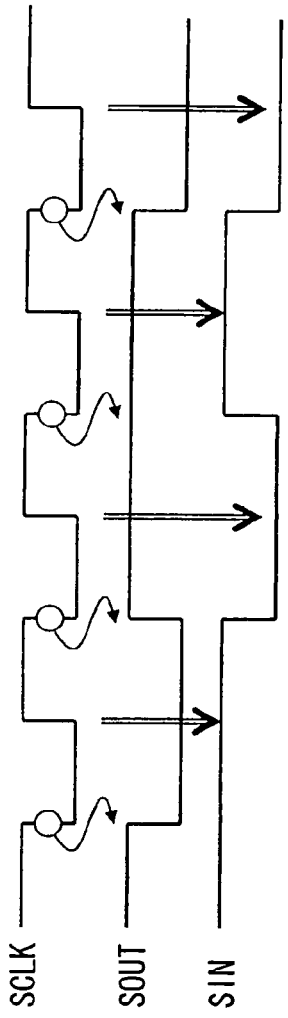

SCLK
SOUT
SIN

<FUNCTION>
· TERMINAL OUTPUT (TRANSMISSION) WHEN EDGE IS DETECTED
· SAMPLE (RECEIVE) TERMINAL WHEN EDGE IS DETECTED
· EXTERNAL CLOCK/INTERNAL CLOCK
· LSB FIRST/MSB FIRST
· CLOCK POLARITY
· OVERRUN ERROR

<IMPLEMENTATION BY PERIPHERAL INSTRUCTION>
· INPUT CAPTURE INSTRUCTION ···DETECT EDGE OF SCLK
· CONDITION-ADDED OUTPUT INSTRUCTION ···TERMINAL OUTPUT WHEN EDGE IS DETECTED
(CONDITION IS SATISFIED)
· CONDITION-ADDED SAMPLING INSTRUCTION ···SAMPLING WHEN EDGE IS DETECTED
(CONDITION IS SATISFIED)

FIG. 14

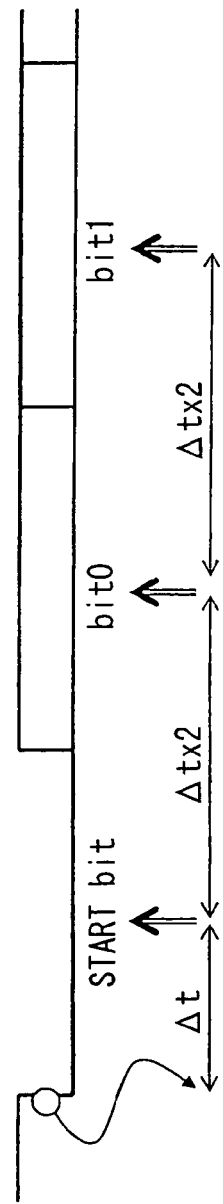

<FUNCTION>
· SAMPLE TERMINAL AFTER Δt FROM DETECTION OF EDGE, AND THEN SAMPLE (RECEIVE) EVERY (Δtx2)
· TERMINAL OUTPUT (TRANSMIT) EVERY (Δtx2)
· OVERRUN ERROR, FRAMING ERROR, PARITY ERROR

<IMPLEMENTATION BY PERIPHERAL INSTRUCTION>
· INPUT COMPARE SET INSTRUCTION ···DETECT EDGE OF TERMINAL AND SET COMPARE PERIOD
· SAMPLING COMPARE INSTRUCTION ···SAMPLE TERMINAL AT THE TIME OF PC COINCIDENCE
· OUTPUT COMPARE SET INSTRUCTION ···TERMINAL OUTPUT AT THE TIME OF PC COINCIDENCE

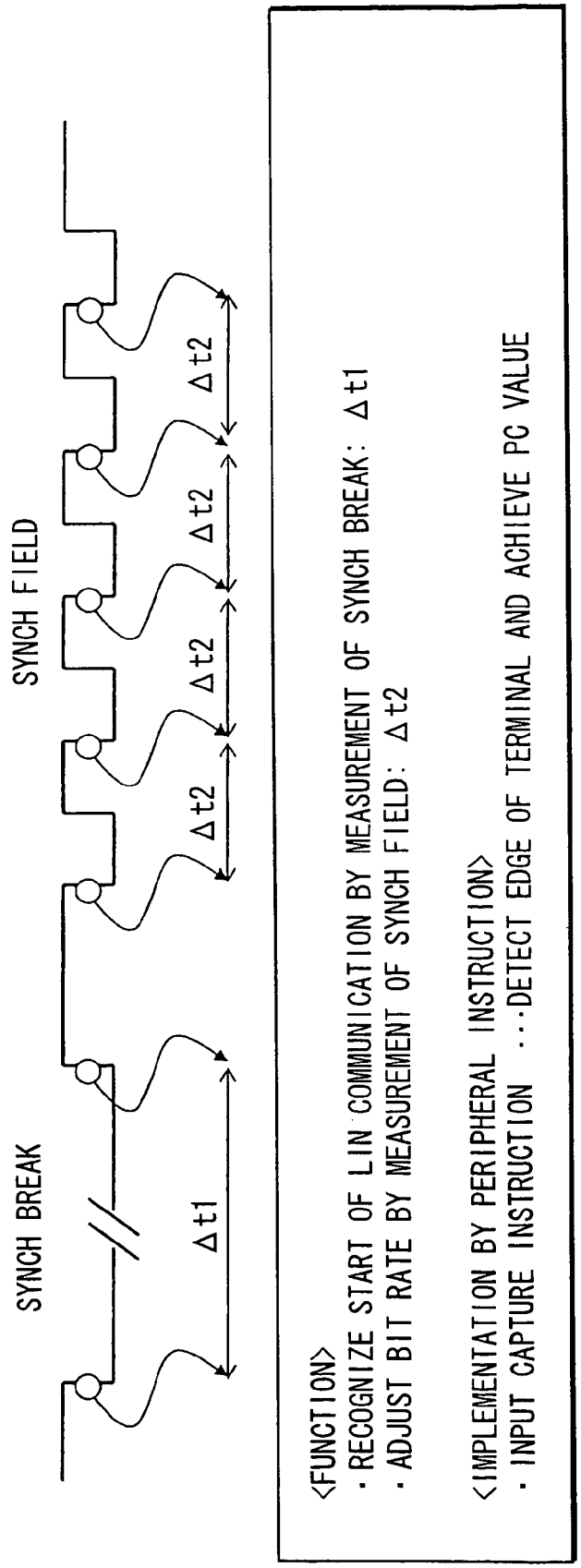

bmov INSTRUCTION
(BIT TRANSFER)

INSTRUCTION CODE

[IN THE CASE OF bit_q≠bit_s]

[IN THE CASE OF bit_q=bit_s]

MICROCOMPUTER AND ENCODING SYSTEM FOR EXECUTING PERIPHERAL FUNCTION INSTRUCTIONS

CROSS REFERENCE TO RELATED APPLICATIONS

This application is a divisional of U.S. patent application Ser. No. 11/330,237 filed on Jan. 12, 2006 and entitled MICROCOMPUTER AND ENCODING SYSTEM FOR INSTRUCTION CODE, and is based upon, claims the benefit of priority of, and incorporates by reference the contents of Japanese Patent Application Nos. 2005-9413 filed on Jan. 17, 2005, and 2005-251317 filed on Aug. 31, 2005.

TECHNICAL FIELD

The technical field relates to a microcomputer that can execute time-divisional parallel processing on plural tasks, wherein at least one of these tasks is a specific task in which a program looped so that an increment of instruction addresses is fixed is described, and also relates to an encoding system for an instruction code executed by a CPU, and the CPU having an instruction decoder adopting the encoding system.

BACKGROUND

When a microcomputer constructed by adding a CPU with ROM, RAM and other peripheral functions is applied to various user applications, usually, it is necessary to change the hardware of the microcomputer in connection with functions required for each application, and thus there is a problem that the number of variations of products is increased.

Therefore, there may be considered such a construction that an operation as a function is implemented by software. For example, JP-A-6-250857 discloses a microcomputer in which two tasks (A, L) are subjected to time-divisional parallel processing in one CPU and execution of a branch instruction is prohibited in the L-task to establish fix-looping, whereby the value of a program counter is used as a timer or runaway monitoring processing of the A-task is executed.

However, in order to implement an "input capture" function of achieving a timer value in accordance with a level variation of a specific input terminal or a more complicated peripheral function such as serial communication or the like in the microcomputer disclosed in the above publication, the program size is greatly increased.

Furthermore, JP-A-2004-38521 discloses a construction in which a prefix instruction is disposed just before a target instruction described in a program and the function of the target instruction is extended in accordance with the state of a flag set in the prefix instruction.

However, in the technique disclosed in JP-A-2004-38521, it is necessary to insert the prefix instruction in order to extend the instruction function, and thus the program size is necessarily increased.

It is generally required that more kinds of instructions are installed in the CPU, and in order to satisfy this requirement, it is necessary to compress the size of the overall instruction code to a maximum. Japanese Patent No. 2,682,469 discloses one of these techniques. As shown in FIG. 20, this technique is an encoding system of code-expanding an offset operand (lower-order bits (2 to 0) of offset) as an operation code field for the same operation code (ope2) to thereby allocate plural instructions.

That is, the technique disclosed in the above Japanese Patent is established on the basis of the assumption that "0" is allocated to the lower-order bits of the offset field which will serve as bits for code expansion. Accordingly, this technique is not applicable to an instruction code in which other parameters are set to the lower-order bits.

SUMMARY

In view of the foregoing situation, it is a concern of this disclosure to provide a microcomputer that can implement various peripheral functions by software under the condition that an increase of the program size is suppressed to a maximum.

According to a first aspect, a CPU is designed so that a peripheral function instruction described in a specific task can be executed as one instruction. Information needed to execute the peripheral functional instruction is achieved from a general-purpose register indicated by an operand, and also information concerning an execution result of the instruction concerned is stored in a general-purpose register. Accordingly, description of a program for implementing a peripheral function by software is very simple, and the program size can be reduced. Furthermore, a bit of the general-purpose register can be operated by an instruction which is normally prepared by the CPU. Therefore, in order to execute the peripheral function instruction, it is unnecessary to prepare a special instruction such as a prefix instruction separately. The phrase "peripheral function is implemented by software" indicates that the peripheral function is implemented in cooperation between the hardware corresponding to the internal construction of the CPU in the microcomputer and the program executed by CPU concerned.

According to a second aspect, the CPU achieves from the general-purpose register edge indicating information which serves as a condition for achieve a timer value. If a previously sampled level of the input terminal which is stored in the general-purpose register is compared with the present level of the present input terminal, it can be judged whether the achievement condition (rise-up or falling of edge) is satisfied or not. The value of the timer count achieved when the condition is satisfied is stored as a capture value, and also a flag indicating that an input capture comes into effect is stored. Accordingly, by executing an input capture instruction after the edge indicating information is set in the general-purpose register by a normal instruction in advance, the input capture function can be implemented by software.

According to a third aspect, when executing a sampling compare instruction, the CPU achieves a compare period value set in a general-purpose register. Furthermore, the data achieved by accumulating and adding the compare period value for every sampling timing are stored as a compare value in the general-purpose register. When the compare value concerned matches a timer counter value, the sampling result and a satisfaction flag are stored in the general-purpose register. Accordingly, by executing a sampling compare instruction after the compare period value is set in the general-purpose register on the basis of a normal instruction in advance, the sampling compare function can be implemented by software.

According to a fourth aspect, when an input compare set instruction is executed, the CPU achieves the compare period value set in the general-purpose register and edge indicating information of the input terminal which corresponds to a compare set condition. If the compare set condition is satisfied, the value achieved by adding the timer counter value at that time with the compare period value is stored as a compare value in the general-purpose register, and also the satisfaction flag is stored. Accordingly, the compare period value and the edge indicating information are set in the general-purpose register by the normal instruction in advance, and then the input compare set instruction is executed, whereby the input compare set function can be implemented by software.

According to a fifth aspect, when a condition-added sampling instruction is executed, the CPU judges whether a condition flag is set in the general-purpose register. If the setting of the condition flag is recognized, the sampling result and the satisfaction flag are stored in the general-purpose register. Accordingly, when a predetermined condition is satisfied during execution of a specific task, by setting the condition flag in the general-purpose register on the basis of a normal instruction, the condition-added sampling function can be implemented by software.

According to a sixth aspect, when an instruction of an input processing system is executed, the CPU is equipped with a twice coincidence filter function of storing a previous input terminal state and a present input terminal state into the general-purpose register and permitting execution of the instruction of the input processing system when both the values match each other. Here, "the instruction of the input processing system" means the "input capture instruction", "sampling compare instruction", "input compare set instruction", "condition-added sampling instruction" according to the second to fifth aspects. Accordingly, the input processing system instruction can be executed at the stage that it is confirmed that the state of the input signal or data becomes stable.

According to a seventh aspect, the CPU is designed so that it is selectable in accordance with the bit in the general-purpose register whether it is possible or not to execute the twice coincidence filter function. Therefore, whether it is necessary or not to use the filter multifunction concerned can be selected in accordance with the user's application.

According to an eighth aspect, when an output compare instruction is executed, CPU achieves a compare period value and an output level indicating condition set in the general-purpose register. Furthermore, as in the case of the sampling compare instruction, the data achieved by accumulating and adding the compare period and the compare value are stored in the general-purpose register, and if the compare value and the timer counter value match each other, the indicated level is output from the output terminal, and the satisfaction flag is stored in the general-purpose register. Accordingly, by executing the output compare instruction after the compare period value is set in the general-purpose register on the basis of a normal instruction in advance, the output compare function can be implemented by software.

According to a ninth aspect, when a condition-added output instruction is executed, the CPU achieves an output level indicating condition set in the general-purpose register. Furthermore, the CPU judges whether a condition flag is set in the general-purpose register. If the setting of the condition flag is recognized, the level corresponding to the indicated condition is output to the output terminal, and also the satisfaction flag is stored in the general-purpose register. Accordingly, when a predetermined condition is satisfied while a specific task is executed after the output level indicating condition is set in the general-purpose register by the normal instruction in advance, by setting the condition flag in the general-purpose register on the basis of the normal instruction, the condition-added output function can be implemented by software.

It is also a concern of the present disclosure to provide an instruction code encoding system that can allocate plural instructions to an instruction code in which all operands other than an operation code are set as parameters, and a CPU having an instruction decoder adopting the encoding system.

According to an instruction code encoding system of a tenth aspect, when an operation target indicated by plural operands in an instruction code is a combination in which a result achieved by executing an instruction indicated by an operation code does not vary, the processing corresponding to an instruction different from the instruction is executed. That is, in some combination of the instruction content of an operation code and a target executing the instruction concerned, there may occur such a case that the execution result of the instruction does not vary and the same situation as execution of NOP (No Operation) instruction occurs.

Accordingly, in such a case that indication of plural operands in an instruction code induces the result described above, the combination is a practically unusable combination, and thus even when an instruction which is different in execution style from the original instruction is executed, the performance is not degraded and thus there is no problem. Accordingly, plural instructions can be allocated to an instruction code in which all fields other than the operation code are set as parameters.

According to an instruction code encoding system of an eleventh aspect, in a case where the instruction code has two operands and the instruction indicated by the operation code executes an operation for operation targets indicated by the two operands, when the operation targets indicated by the two operands are identical to each other and the execution result of the operation on these operation targets does not vary, the operation is executed between the operation targets and another predetermined operation target.

That is, the instructions for executing the instruction on targets indicated by two operands contains an instruction in which the execution result does not vary if they are the same target. Accordingly, when the indication of the two operands is set to the same target in such an instruction, another instruction can be allocated.

According to CPU of a twelfth aspect, the instruction decoder adopts the instruction code encoding system of the tenth or eleventh aspect, whereby more diverse instructions can be executed without increasing the number of prepared instruction sets.

BRIEF DESCRIPTION OF THE DRAWINGS

The above and other objects, features and advantages will become more apparent from the following detailed description made with reference to the accompanying drawings. In the drawings:

FIG. 3A is a set state of each bit in a general-purpose register for an input capture instruction, FIG. 3B shows the content of processing executed in an executing stage of pipeline processing which is represented by C language, and FIG. 3C is a timing chart showing an example of an executing mode;

FIGS. 4A-4C correspond to FIGS. 3A-3C for a sampling compare instruction;

FIGS. 5A-5C correspond to FIGS. 3A-3C for an output compare instruction;

FIGS. 6A-6C correspond to FIGS. 3A-3C for an input compare set instruction;

FIGS. 7A-7C correspond to FIGS. 3A-3C for a condition-added sampling instruction;

FIGS. 8A-8C correspond to FIGS. 3A-3C for a condition-added output instruction;

FIG. 13 corresponds to FIG. 9 for a clock synchronous serial communication function;

FIG. 14 corresponds to FIG. 9 for a UART communication function;

FIG. 15 corresponds to FIG. 9 when a bit synchronous function to be executed at the communication start time of LIN;

DETAILED DESCRIPTION OF THE PREFERRED EMBODIMENTS

A preferred embodiment will be described hereunder with reference to the accompanying drawings.

Figure 1:
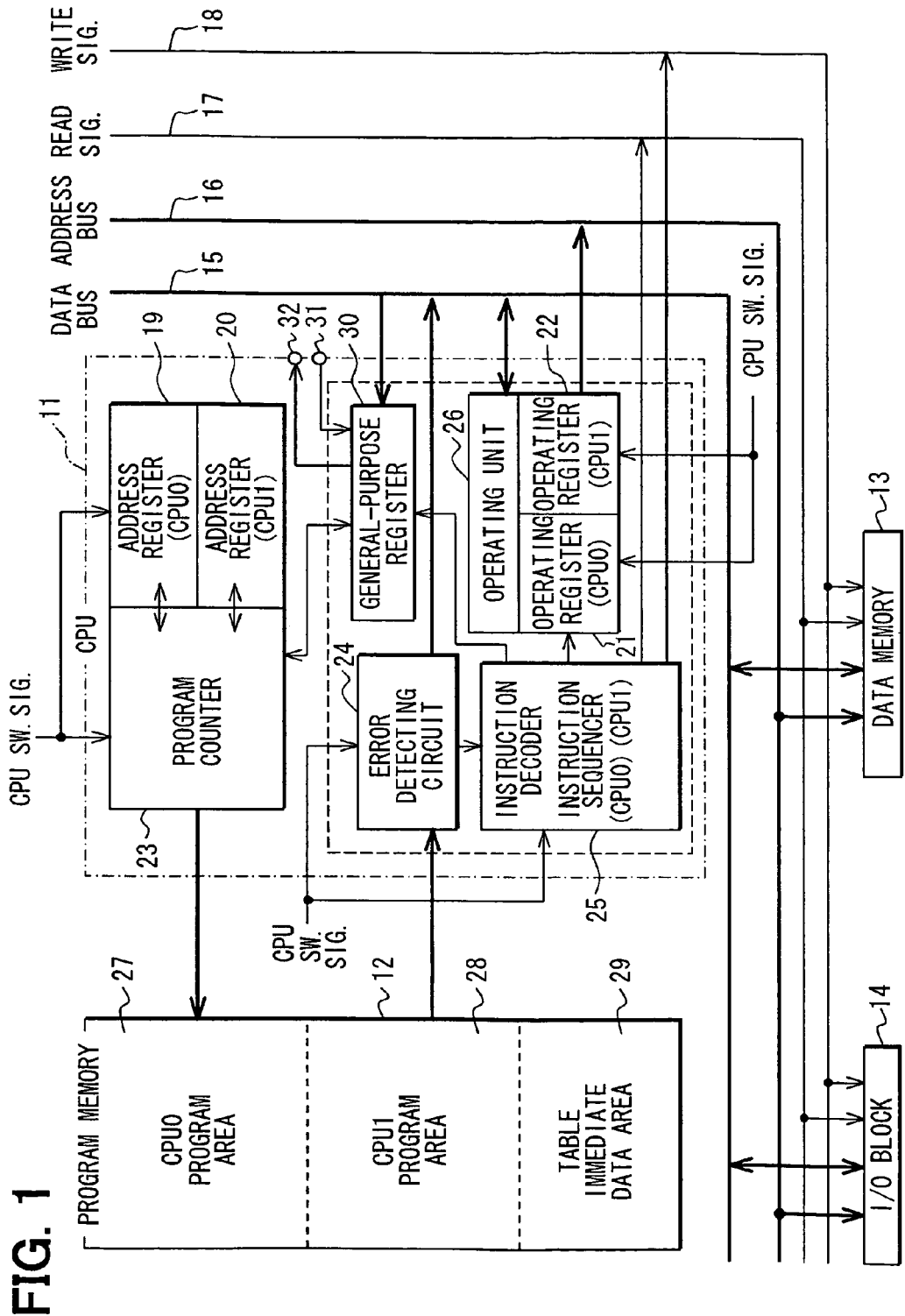
FIG. 1 is a functional block showing the construction of a microcomputer according to a preferred embodiment.

FIG. 1 is a functional block diagram showing the construction of a microcomputer 10. The microcomputer 10 is equipped with a CPU 11, a program memory 12 constructed by a ROM, a data memory 13 constructed by RAM, an I/O block 14 (input/output pin), a timing generator (not shown) for generating a CPU switching signal (clock signal) described later, a data bus 15 for transmitting/receiving data, an address bus 16 for transmitting/receiving an address signal, and control buses 17, 18 for transmitting/receiving a read signal and a write signal.

CPU 11 is equipped with two address registers 19, 20 and two operating registers 21, 22 to time-divisionally executing pipeline processing on two kinds of tasks (L-task, A-task) in parallel, and alternately switching the address registers 19, 20 and the operating registers 21, 22 on the basis of the CPU switching signal, whereby the CPU 11 functions apparently so that two CPUs are alternately switched and operated.

In this case, one address register 19 and one operating register 21 serve as registers for CPU0 (for L-task), and the other address register 20 and the other operating register 22 serve as registers for CPU1 (for A-task). The value of a program counter 23 (an address of an instruction to be next fetched) is renewed in accordance with the switching between the address registers 19, 20, and the address signals for CPU0 (for L-task) and CPU1 (for A-task) are alternately output from the program counter 23 to the program memory 12.

Furthermore, CPU 11 contains therein an error detecting circuit 24 as an error detecting unit for identifying the type of A-task to which an instruction read out from the program memory 12 belongs and detecting an error thereof, and an instruction decoder/instruction sequencer 25 for decoding (deciphering) an instruction passed through the error detecting circuit 24. In accordance with the content of the instruction decoded by the instruction decoder/instruction sequencer (hereinafter referred to as instruction decoder) 25, a calculating operation is executed in an operating unit 26 (ALU) by using operating registers 21, 22 in accordance with the content of an instruction decoded by the instruction decoder/instruction sequencer, or a read signal or write signal is output to the control buses 17, 18.

The program memory 12 is equipped with a program area 27 for CPU0 (for L-task), a program area 28 for CPU1 (for A-task), and a table immediate data area 29 therein. In this case, the L-task stored in the program area 27 for CPU0 is constructed by a fix-looped program in which a branch instruction having a risk that it falls into a program runaway state is prohibited. Accordingly, at the execution time of the program of the L-task, the execution is started from address 0 by 2-byte instruction access, and the instructions are successively executed like address 2, address 4, address 6, . . . . Thereafter, the program counter 23 overflows when the address reaches a predetermined address, and returns to the address 0. Thereafter, the instruction execution is repeated in the above address order. In this L-task, all the instructions are fixed to one-word (two-byte) instructions.

The L-task (specific task) is suitable to execute the sequence control processing, and the program thereof contains an A-task runaway monitoring routine and a backup sequence routine for satisfying fail safe of the system. Furthermore, the L-task is also equipped with a function as a timer based on a fix-loop operation. For example, when an increment instruction or decrement instruction is executed and the count value thereof reaches a predetermined set value, fixed time processing equivalent to timer interrupt can be performed by generating interrupt in the processing of the A-task.

On the other hand, the A-task is permitted to contain a branch instruction which is prohibited to the L-task, and thus it is suitable for complicated analysis processing/numerical calculation. As in the case of the L-task, all the instructions are also fixed to one-word instructions in the A-task. Both of an operation code and an operand (address) are allocated in one word for the A-task and the L-task.

Figure 2:
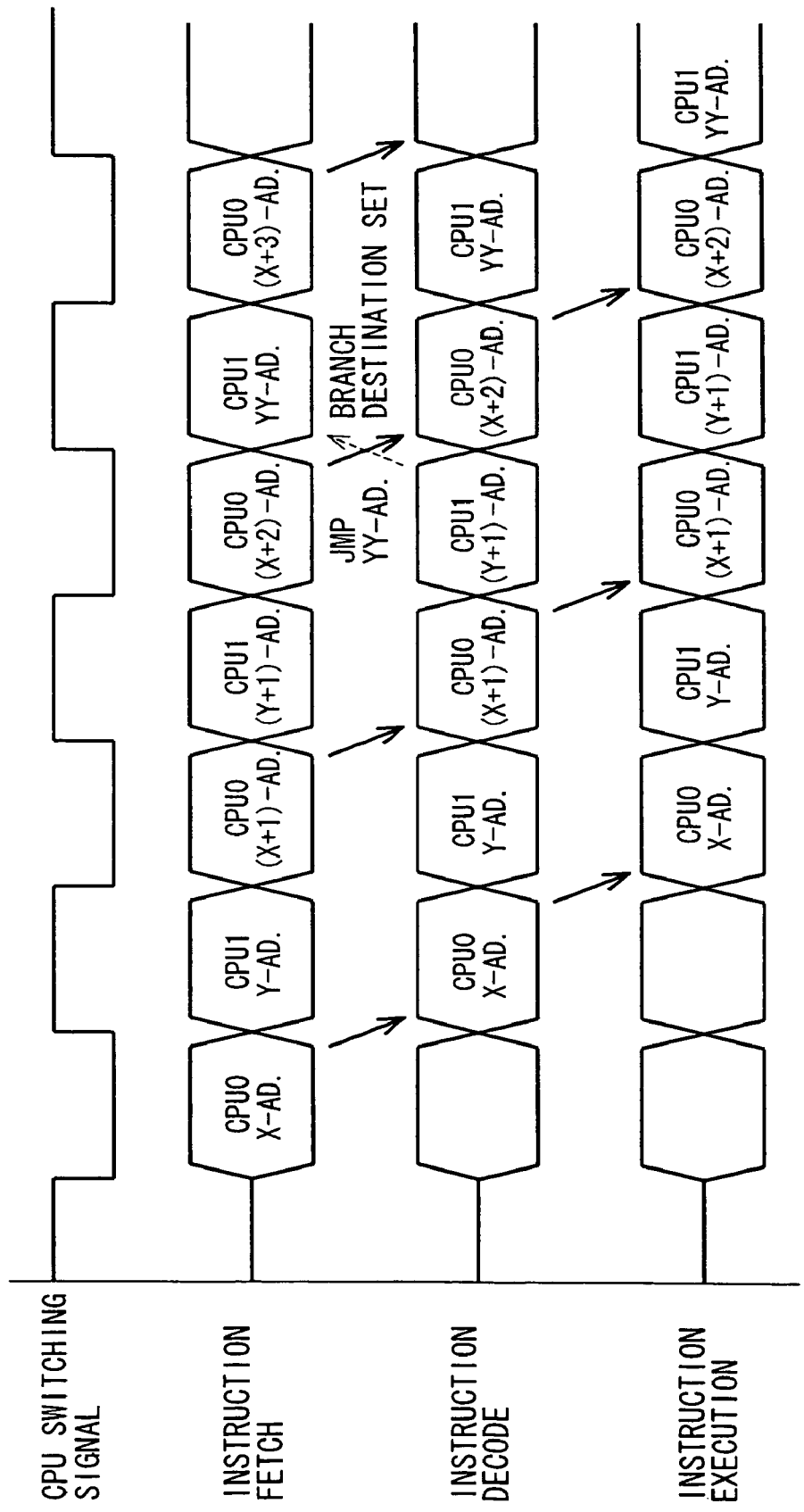
FIG. 2 is a timing chart showing a state where the microcomputer executes time-divisional parallel processing on A-task and L-task.

Next, a pipeline control system adopted in the microcomputer thus constructed will be described with reference to FIG. 2. The pipeline is constructed as a three-stage pipeline comprising respective stages of instruction fetch, instruction decode and instruction execution, for example, and designed so that all the instructions can be processed by the three-stage pipeline with no delay. Each stage is executed by one cycle, and one instruction is executed by three cycles. However, parallel processing is executed on these three instructions by the three-stage pipeline, whereby it is apparently equivalent to a system in which one instruction is executed by one cycle.

The time of one cycle (each stage) is defined by a CPU switching signal (clock signal). With respect to the CPU switching signal, a low-level time Tlo and a high-level time Thi are equal to each other. The instruction fetch of CPU0 (L-task) is executed for the low-level period, and the instruction fetch of CPU1 (A-task) is executed for the high-level period, whereby both the programs of CPU0 (L-task) and CPU1 (A-task) are subjected to the pipeline processing in parallel at the time-divisional ratio of 1:1.

Furthermore, when CPU1 fetches the branch instruction contained in the program of the A-task, it is constructed so as to set a branch destination address at an instruction decode stage in order to fetch the instruction of the branch designation address at the next instruction fetch stage of the A-task containing the branch instruction concerned. FIG. 2 shows the processing timing when an instruction at an address (Y+1) of CPU1 is a branch instruction (JMP).

CPU 11 is equipped with plural address registers 19, 20 for successively setting an instruction address different to the program counter 23, and plural operating registers (instruction registers) 21, 22 for successively setting the instruction decoded by the instruction decoder 25 to the operating unit 26, and the plural programs 27, 28 stored in the program memory 12 can be subjected to the pipeline processing by successively switching the plural address registers 19, 20 and the plural operating registers 21, 22.

Furthermore, a "peripheral function instruction" described later is prepared as an instruction set of CPU 11. The "peripheral function instruction" is an instruction prepared so that the processing implemented by hardware constructed at the outside of CPU 11 can be processed in a software style in the L-task by CPU 11. The instruction decoder 25 and the operating unit 26 are constructed so that the peripheral function instruction is implemented at one cycle at the execution stage of the pipeline processing.

For example, when a load instruction is executed on the peripheral circuit of CPU 11, data read out through the data bus 15 is normally stored in the general-purpose register 30. The general-purpose register 30 of this embodiment is constructed so that when the instruction decoder 25 executes a decode operation on an instruction and as a result the instruction concerned is "peripheral function instruction", the input signal level of the input terminal 31 can be stored in some bits or the signal corresponding to data set in some bits can be output through the output terminal 32. Furthermore, transmission of data can be performed between the general-purpose register 30 and the program counter 23. Actually, plural general-purpose registers 30, plural input terminals 31 and plural output terminals 32 exist, however, these elements are illustrated in a single style in FIG. 1 for convenience of illustration.

Next, the action of this embodiment will be described with reference to FIGS. 3A to 15.

FIGS. 3A to 8A show set states of each bit in the general-purpose register when CPU 11 executes the peripheral function instruction, FIGS. 3B to 8B show the contents of processing executed at one cycle (by hardware) in the execution stage of the pipeline processing in the instruction decoder 25 or the operating unit 26, the contents being represented by C language, and FIGS. 3C to 8C are timing charts showing examples of the execution mode.

<Input Capture Instruction>

FIG. 3B shows the content of the input capture instruction. The input capture function serves to read in the count value of a free run counter at a timing at which a specific trigger signal is given. For example, it is used when the time between signal edges of an input terminal is measured or for mere edge detection. In this embodiment, when CPU 11 executes an input capture instruction described in the L-task, by using the count value of the program counter 23 as a timer counter, it is processed in a software mode in CPU 11.

Here, "processing in a software mode" means the processing that is completed inside CPU 11 in comparison with processing executed by using hardware provided at the outside of CPU 11. That is, the term "software mode" is used to refer to operations based on internal logics of CPU 11.

As shown in FIG. 3A, when the input capture instruction is executed, each bit of a register Rm which is one type general-purpose register 30 is allocated as follows.

Bit
15: present input terminal state (level)
14: previous input terminal state (level)
13: Sampling value (level) of input terminal
11: twice-coincidence filter allow/prohibition
10, 9: signal edge indication of input terminal
8: input capture satisfaction flag
7 to 0: capture value The twice-coincidence filter allowance/prohibition in bit 11 and the signal edge indication of the input terminal in bit 10, 9 are set in the register Rm in advance by a load instruction described at the A-task side, and the register Rm is indicated by an operand in the input capture instruction.

With respect to the input capture instruction, the processing content shown in FIG. 3B is executed in the execution stage. The procedure shown in FIG. 3B is not executed step by step, but when the input capture instruction is executed, these processing is executed at one cycle by the instruction decoder 25 or the logic of the operating unit 26.

That is, when the twice-coincidence filter allowance is set in the bit 13, the exclusive OR of the bits 15, 14 is satisfied, and if both are non-coincident with each other, the content of the bit 15 is transferred to the bit 14. Even when both are coincident with each other, the content of the bit 15 at that time is likewise transferred to the bit 14. When filter prohibition is set, the content of the bit 15 is transferred to the bit 14 without executing the first non-coincidence judgment. Then, the edge judgment of the input terminal 31 is executed.

In the edge judgment, the bit 15 which is the level of the input terminal 31 at the present time is compared with the bit 13 in which the level of the input terminal 31 when the same instruction is previously executed is stored as a sampling value. If both are coincident with each other, there is no variation in input level and thus no edge is detected. Therefore, the content of the bit 15 is transferred to the bit 13, and the processing is finished.

On the other hand, if both the bits 15, 13 are non-coincident with each other, the level of the input terminal 31 is varied, and the edge is detected. In this case, it is judged that the edge condition (rising, falling, any edge) indicated by the bits 10, 9 is satisfied. If the condition concerned is satisfied, the value of the program counter 23 is stored in the bit 7:0 of the register Rm, the satisfaction flag is put up in bit 8, and then the processing is finished. The indication of each input terminal 31 may be changeable by another general-purpose instruction even when it is fixed at default.

If the input capture function is implemented by providing a circuit exterior to the CPU 11, such a following circuit would generally require:
(1) Free run timer;
(2) Capture register for storing the count value of the free run timer; and
(3) Control register for indicating an edge as a trigger and selecting the presence or absence of the twice-coincidence filter.

On the other hand, in this embodiment, (1) is supported by the program counter 23, and (2) and (3) are supported by the register Rm, whereby the input capture function is implemented by CPU 11 alone as hardware.

<Sampling Compare Instruction>

FIG. 4 shows the content of the sampling compare instruction. The sampling compare function samples the level of the input terminal 31 every time the indicated sampling period elapses. In this case, the count value of the program counter 23 is used as a timer counter.

As shown in FIG. 4A, when the sampling compare instruction is executed, each bit of the registers Rm, Rn in the general-purpose register 30 is allocated as follows.

Register Rm
bit
15: present input terminal state (level)
14: previous input terminal state (level)
13: sampling value (level) of input terminal
12: sampling result (in the case of 1 bit)
11: twice-coincidence filter allowance/prohibition
10, 9: indication of sampling
8: sampling compare satisfaction flag
7 to 0: compare value Register Rn
bit
15 to 8: sampling result (in the case of 1 bite)
7 to 0: compare period With respect to the sampling compare instruction, the processing content as shown in FIG. 4B is executed. In the processing of the twice-coincidence filter, if the bits 15, 14 are non-coincident with each other, the content of the bit 15 is transferred to the bit 14. If both are coincident with each other or the filter prohibition is set, the content of the bit 15 is transferred to each of the bits 14, 13. When the count value of the program counter 23 is above the bit 7:0 of the register Rm, that is, the compare period Δt elapses, the bit 7:0 of the register Rn is added to the bit 7:0 of the register Rm, and the next compare value is set. Then, the satisfaction flag is put up in the bit 8, and the sampling is executed in conformity with a mode indicated by the bits 10, 9 of the register Rm. The sampling indication is set as follows, for example.

| Bit 10, 9 | sampling mode |
| --- | --- |
| 00 | 1 bit |
| 01 | default |
| 10 | 1 byte (left shift) |
| 11 | 1 byte (right shift) |

The left shift corresponds to MSB first, and the bit 13 of the register Rm is stored from the bit 8 side of the register Rn while leftward shifting bit by bit. The right shift corresponds to LSB first, and the bit 13 of the register Rm is stored from the bit 15 side of the register Rn while rightward shifting the register Rn bit by bit.

<Output Compare Instruction>

FIGS. 5A-5B show the content of the output compare instruction. The output compare function outputs a signal from the output terminal every time an indicated compare period elapses. For example, it is used to output a PWM signal and to output a signal interlockingly with a sleep timer for measuring a shift time when the microcomputer 10 is shifted to a sleep mode. In this case, the count value of the program counter 23 is used as a timer counter.

As shown in FIG. 5A, when the output compare instruction is executed, each bit of the registers Rm, Rn in the general-purpose register 30 is allocated as follows.

Register Rm
bit
15: Level setting of output terminal
11 to 9: Indication of output level
8: output compare satisfaction flag
7 to 0: compare value Register Rn
bit
15 to 8: output data (in the case of 1 byte)
7 to 0: compare period The output indication and the compare period are set by other instructions before the output compare instruction is executed. The output compare instruction is executed as follows. First, the count value of the program counter 23 is above the bit 7:0 of the register Rm, that is, the compare period Δt elapses, the bit 7:0 of the register Rn is added to the bit 7:0 of the register Rm and the next compare value is set. Then, the satisfaction flag is put up in the bit 8, and the output is executed in accordance with the mode indicated by the bits 11 to 9 of the register Rm. The indication of the output level is set as follows, for example.

| Bit 11 to 9 | sampling mode |
| --- | --- |
| 000 | no output |
| 001 | output "L" |
| 010 | output "H" |
| 011 | inversion of present level |
| 100 | no output |
| 101 | no output |
| 110 | output 1 byte (right shift) |
| 111 | output 1 byte (left shift) |

The right shift of the 1 byte output corresponds to LSB first, and when the bit 8 of the register Rn is stored in the bit 15 of the register Rm, the bits 15 to 8 of the register Rn are rightward shifted by one bit. Furthermore, the left shift of the 1 byte output corresponds to MSB first, and when the bit 15 of the register Rn is stored in the bit 15 of the register Rm, the bits 15 to 8 of the register Rn are leftward shifted by one bit.

<Input Compare Set Instruction>

FIGS. 6A-6B show the content of the input compare set instruction. The input compare set function sets the compare value when the indicated edge of the input terminal 31 is detected. In this case, the count value of the program counter 23 is also used as a timer counter. The processing of the twice-coincidence filter is the same as the input capture instruction.

As shown in FIG. 6A, when the input compare set instruction is executed, each bit of the registers Rm, Rn in the general-purpose register 30 is allocated as follows.

Register Rm
Bit
15: present input terminal state (level)
14: previous input terminal state (level)
13: Sampling value (level) of input terminal
11: Twice-coincidence filter allowance/prohibition
10, 9: Indication of edge
8: Input compare set satisfaction flag
7 to 0: compare set value Register Rn
Bit
7 to 0: compare value The indication of edge and the compare set value are set by other normal instructions before the input compare set instruction is executed. The input compare set instruction is executed as follows. The processing of the twice-coincidence filter is the same as the input capture instruction or the like, and thus the description thereof is omitted. First, the content of the bit 15 is transferred to the bit 14. Then, the edge judgment of the input terminal 31 is executed as in the case of the input capture instruction. When the edge is detected and the edge condition is satisfied, the bit 7:0 of the register Rm is added to the count value of the program counter 23, and the addition result is set in the bit 7:0 of the register Rn. Then, the satisfaction flag is put up in the bit 8. As shown in FIG. 6C, the input compare set instruction is used, for example when the compare set value Δt is set at the time when the falling edge of a signal is detected or the like.

<Condition-Added Sampling Instruction>

FIGS. 7A-7B show the content of the condition-added sampling instruction. The condition-added sampling function samples the level of the input terminal 31 when a condition flag is set as a result of some processing. As shown in FIG. 7A, when the condition-added sampling instruction is executed, each bit of the register Rm is allocated as follows.

Bit

15: Present input terminal state (level)

14: previous input terminal state

13: sampling value (level) of input terminal

12: sampling result (1 bit)

11: twice-coincidence filter allowance/prohibition

10, 9: indication of sampling

8: condition-added sampling satisfaction flag

7 to 0: sampling result (1 bit)

Furthermore, the condition flag is stored in the bit 8 of the register Rn. As shown in FIG. 7B, when the condition flag is set, the twice-coincidence filter processing and also the sampling processing are executed, and if no condition flag is set, only the twice-coincidence filter processing is executed. In any case, the filter processing is likewise executed when a filter allowance flag is set.

With respect to the sampling processing, the satisfaction flag is put up in the bit 8 of the register Rm, the sampling is executed in accordance with the indication of the sampling as in the case of the sampling compare instruction. However, in the case of 1 byte sampling, the sampling result is stored in the bits 7 to 0 of the register Rm. FIG. 7C shows a case where the sampling is executed under the condition that some falling edge of the input terminal 31 is detected.

<Condition-Added Output Instruction>

FIGS. 8A-8B show the content of the condition-added output instruction. The condition-added output function outputs the indicated level from the output terminal. As shown in FIG. 8A, when the condition-added output instruction is executed, each bit of the register Rm is allocated as follows.

Register Rm bit

15: level setting of output terminal

11 to 9: indication of output level

8: output compare satisfaction flag

7 to 0: output value (1 byte)

The condition flag is stored in the bit 8 of the register Rn. When the condition flag is set in the bit 8 of the register Rn, the condition-added output instruction is executed as the processing content as shown in FIG. 8B. First, when the satisfaction flag is put up in the bit 8 of the register Rm, the output is executed from the output terminal 32 in accordance with the same output indication as the output compare instruction. However, in the case of 1 byte output, data set in the bits 7 to 0 are given to the bit 15 of the register Rm while being shifted bit by bit. FIG. 8C shows a case where inverted output, no output, inverted output are executed under a condition that a rising edge of the input terminal 31 is detected.

[Case Study: CSMA/CD, Reception]

Figure 9:
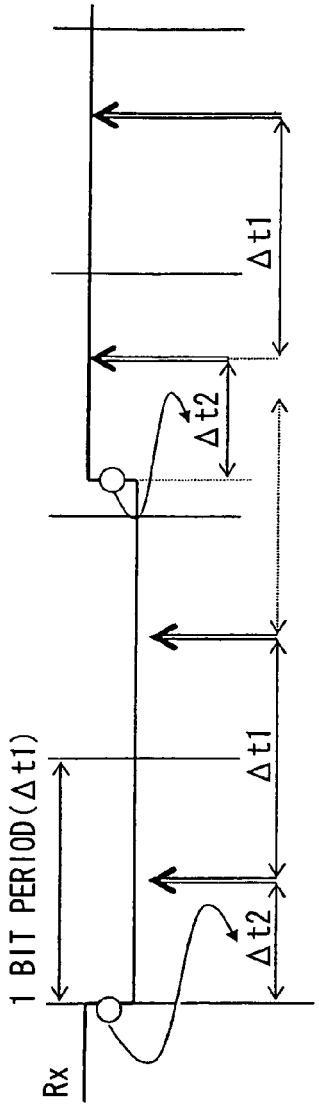
FIG. 9 is a diagram showing a CSMA/CD communication system when the function at a reception side is implemented by a peripheral function instruction.

Next, FIGS. 9 to 15 shows an example of implementing a specific function by using the peripheral function instruction (peripheral instruction) described above. FIG. 9 shows a case where the function at the reception side is implemented for the CSMA/CD system which is one of communication systems used for LAN. The functions to be implemented are as follows.

(1) When the falling of a reception data Rx is detected, the reception data Rx is sampled after Δt2 from that time point.

(2) If no edge is detected as a sampling result of (1), the reception data Rx is further sampled after Δt1 (1 bit period), and if an edge is detected (collision detection), the reception data Rx is further sampled after Δt2 (bit synchronization).

The bit synchronization is executed as follows.

Previous reception data: 0→synchronized at the falling edge

Previous reception data: 1→synchronized at rising edge

Under transmission of dominant "0"→synchronized at falling edge

Under transmission of dominant "1"→synchronized at rising edge

The above functions are implemented by

<Input Compare Set Instruction>

(1) when the edge of the reception data Rx is detected, the sampling timing is changed to Δt2.

<Sampling Compare Instruction>

(2) The reception data Rx is sampled every Δt1.

[Case Study: CSMA/CD, Transmission]

Figure 10:
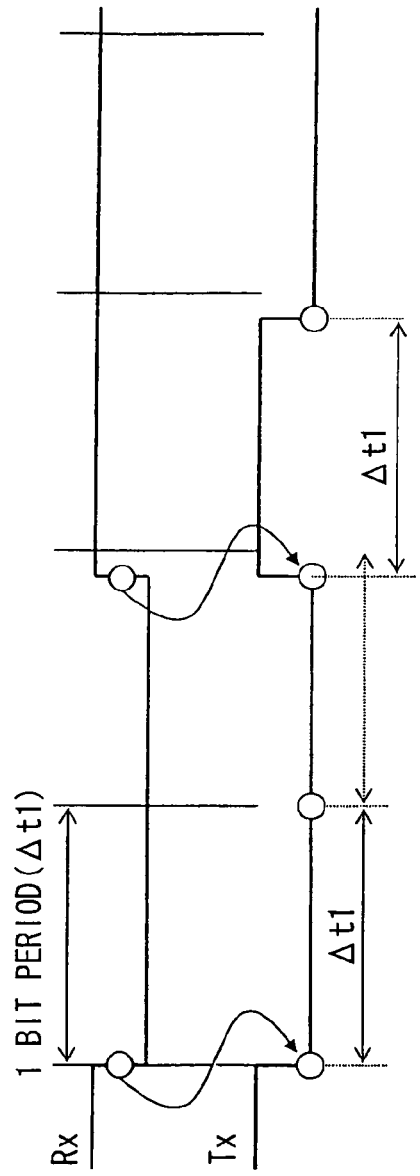
FIG. 10 corresponds to FIG. 9 for the function at a transmission side.

FIG. 10 shows a diagram showing implementation of the function at the transmission side in the CSMA/CD system. The content of the function is as follows.

(1) Transmission data are output every fixed period (Δt1).

(2) Transmission data are output when reception data level varies and an edge is detected.

These functions can be implemented by the following peripheral function instructions:

<Output Compare Instruction>

(1) Transmission data are output from the output terminal every fixed period (Δt1).

<Input Compare Set Instruction>

(2a) The edge of the reception data Rx is detected.

In this case, when the satisfaction flag is set in the bit 8 of the register Rm as an execution result of the instruction concerned, the content of the bit 8 is transferred to the bit 8 of the register Rn.

<Condition-Added Output Instruction>

(2b) Transmission data are output from the output terminal by detecting the edge.

[Case Study: Event Timer]

Figure 11:
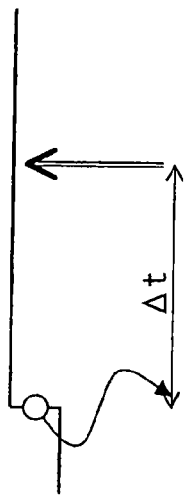
FIG. 11 corresponds to FIG. 9 for an event timer function.

FIG. 11 shows implementation of an event timer function. This function is (1) detecting a signal edge at the input terminal 31, and (2) sampling the level of the input terminal 31 after Δt from the edge detection, and can be implemented by <Input Compare Set Instruction>

(1) detecting the signal edge of the input terminal 31 and setting the compare period Δt, and <Sampling Compare Instruction>

(2) sampling the level of the input terminal 31 at the time when the compare period Δt elapses.

[Case Study: Port Sampling]

Figure 12:
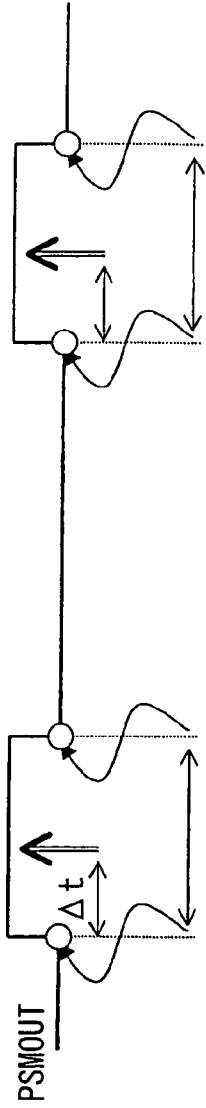
FIG. 12 corresponds to FIG. 9 for a port sampling function.

FIG. 12 shows a port sampling function. This function is (1) outputting a signal from the output terminal at any timing, and (2) sampling the input terminal 31 after Δt when the signal edge of the output terminal is detected. The sampling port can be selected from "32", for example. These functions can be implemented by <Output Compare Instruction>

(1) outputting a signal from the output terminal 32 (PSMOUT) when the program counter 23 is coincident with a predetermined count value, and <Input Compare Set Instruction>
(2a) setting the compare period by detecting the edge of the output terminal 32, and
(2b) sampling the input terminal 31 when the program counter 23 is coincident with the compare period.

[Case Study: Clock Synchronous Serial]

FIG. 13 shows a case where a clock synchronous serial communication function is implemented. The communication function is as follows.

(1) A signal is output (transmitted) from the output terminal 32 (SOUT) by detecting the falling edge of a serial clock SCLK, and
(2) The input terminal 31 (SIN) is sampled (received) by detecting the rising edge of SCLK, and there are other functions such as selection of an external clock/an internal clock, LSB/MSB first, clock polarity, detection of an overrun error, etc.

The functions (1), (2) are implemented by the peripheral function instruction as follow.

<Input Capture Instruction>
(1a) Detecting the edge (falling, rising) of SCLK
<Condition-Added Output Instruction>
(1b) Outputting transmission data from the output terminal 32 by detecting the edge (falling)
<Condition-Added Sampling Instruction>
(2) Sampling the input terminal 31 by detecting the edge (rising)

[Case Study: UART]

FIG. 14 shows a case where a UART communication function is implemented. This communication function executes
(1) Sampling the input terminal 31 after Δt from the edge detection (falling, start bit detection)
(2) thereafter, sampling (receiving) the input terminal 31 every (Δt×2)
(3) or outputting data from the output terminal 32 every (Δt×2), and detection of overrun error, framing error, parity error, etc.

The functions of (1) to (3) are implemented by the peripheral function instruction as follows.

<Input Compare Set Instruction>
(1) Detecting the signal edge (rising) of the terminal and setting the compare period Δt
<Sampling Compare Instruction>
(2) Sampling the input terminal 31 when the program counter is coincident
<Output Compare Instruction>
(3) Outputting data from the output terminal 32 when the program counter is coincident (period: Δt×2)

[Case Study: LIN]

FIG. 15 shows a case where a bit synchronous function executed at the communication start time is implemented in LIN which is one type of in-vehicle LAN. This function is as follows.

(1) Recognizing start of communication when it is measured that the low level period of SYNCH BREAK reaches Δt
(2) Measuring the clock period (between falling edges) Δt2 to be transmitted in SYNCH FIELD, and adjusting a bit rate (measuring over four periods and divided by "8")

The functions (1) and (2) are implemented by the peripheral function instruction as follows.

<Input Capture Instruction>
The edge of the input terminal 31 is detected to achieve the count value of the program counter 23. The other processing can be implemented by the normal instruction.

That is, as described above, plural communication functions different in system can be implemented by software. Therefore, it is unnecessary to mount communication interface LSI in the microcomputer 10 in connection with each case where each communication function is implemented. Accordingly, the general versatility of the microcomputer 10 can be enhanced.

As described above, according to the embodiment described above, CPU 11 of the microcomputer 10 is designed so that the peripheral function instruction described in the L-task can be executed as one instruction. CPU 11 achieves information needed to execute the peripheral function instruction from the general-purpose register 30 indicated by an operand, and also stores the information concerning the execution result of the instruction concerned into the general-purpose register 30. Accordingly, the description of the program for implementing the peripheral function by software can be remarkably simplified, so that the program size can be reduced. Furthermore, the bit of the general-purpose register 30 can be operated by an instruction which is normally prepared in CPU 11, and thus it is unnecessary to separately prepare for a special instruction such as a prefix instruction in order to execute the peripheral function instruction.

Furthermore, when the input capture instruction is executed, CPU 11 achieves the edge indicating information of the input terminal 31 as a condition for achieving the timer value from the general-purpose register 30, judges on the basis of the state information of the input terminal 31 stored in the general-purpose register 30 whether the achieving condition is satisfied or not, stores as a capture value the value of the program counter 23 at the time when the condition concerned is satisfied, and also stores the satisfaction flag. Accordingly, by executing the input capture instruction after the edge indicating information is set in the general-purpose register 30 by the normal instruction in advance, the input capture function can be implemented by software.

Furthermore, when the sampling compare instruction is executed, CPU 11 achieves the compare period value set in the general-purpose resister 30, and stores the data achieved by accumulating and adding the compare period value every sampling timing as a compare value in the general-purpose register 30. When the compare value and the value of the program counter 23 are coincident, the sampling result and the satisfaction flag are stored into the general-purpose register 30. Accordingly, by executing the sampling compare instruction after the compare period value is set in the general-purpose register 30 by the normal instruction in advance, the sampling compare function can be implemented by software.

Furthermore, when the input compare set instruction is executed, CPU 11 achieves the compare period value set in the general-purpose register 30 and the edge indicating information of the input terminal 31 which is a compare set condition, and if the condition concerned is satisfied, the value of the program counter 23 at that time point is added with the compare period value. The addition result is stored as the compare value in the general-purpose register 30, and also the satisfaction flag is stored. Accordingly, the compare period value and the edge indicating information are set in the general-purpose register 30 by the normal instruction in advance, and then the input compare set instruction is executed, whereby the input compare set function can be implemented by software.

When the condition-added sampling instruction is executed, CPU 11 judges whether the condition flag is set in the general-purpose register 30. If the setting of the condition flag is recognized, CPU 11 stores the sampling result and the satisfaction flag into the general-purpose register 30. Accordingly, when a predetermined condition is satisfied while the L-task is executed, the condition flag is set in the general-purpose register 30 by the normal instruction, whereby the condition-added sampling function can be implemented by software.

Furthermore, when CPU 11 executes the input capture instruction, the sampling compare instruction, the input compare set instruction or the condition-added sampling instruction, which are the instructions of the input processing system, CPU 11 is equipped with the twice-coincidence filter function of storing the previous and present states of the input terminal 31 into the general-purpose register 30 and allowing execution of the input processing system instruction when both the values are coincident with each other. Therefore, the input processing system instruction is executed at the stage whether it is confirmed that the state of the input signal or data is stabilized. CPU 11 is designed so that execution or non-execution of the twice-coincidence filter function can be selected in accordance with the setting of the bit in the general-purpose register 30. Therefore, the necessity or non-necessity of the filter function can be selected in accordance with the user's application.

Furthermore, when the output compare instruction is executed, CPU 11 achieves the compare period value and the output level indicating condition set in the general-purpose register 30, and the compare value is stored in the general-purpose register 30 as in the case of the sampling compare instruction. If the compare value and the value of the program counter 23 are coincident with each other, the indicated level is output from the output terminal, and also the satisfaction flag is stored in the general-purpose register 30. Accordingly, the compare period value is set in the general-purpose register 30 in advance by the normal instruction, and then the output compare instruction is executed, whereby the output compare function can be implemented by software.

Still furthermore, when the condition-added output instruction is executed, CPU 11 achieves the output level indicating condition set in the general-purpose register 30, and judges whether the condition flag is set in the general-purpose register 30. If the setting of the condition flag is recognized, CPU 11 outputs the level corresponding to the indicated condition to the output terminal, and also stores the satisfaction flag into the general-purpose register 30. Accordingly, when a predetermined condition is satisfied while the specific task is executed after the output level indicating condition is set in the general-purpose register 30 in advance by the normal instruction, the condition-added output function can be implemented by the software if the condition flag is set in the general-purpose register 30 by the normal instruction.

The present invention is not limited to the embodiments described above and shown in the figures, and the following modifications may be made.

The function of setting execution or non-execution of the twice-coincidence filter may be provided as occasion demands, and the twice-coincidence filter function itself may be provide as occasion demands.

The number of tasks to be processing time-divisionally and in parallel by CPU may be equal to three or more.

With respect to the peripheral function instruction, a necessary peripheral function instruction may be suitably selected and implemented in accordance with the specification of the microcomputer.

Another preferred embodiment will be described with reference to FIGS. 16A to 20. FIG. 19 is a functional block diagram showing an internal construction of a CPU which is associated with the subject matter of the preferred embodiment. CPU 1 is equipped with a controller 2, an arithmetic logic unit (ALU) 3, a register portion 4, etc. The controller 2 comprises a decoder (instruction decoder) 5 for decoding an instruction fetched from an external program memory (not shown), and a sequencer 6 for controlling instruction execution in the arithmetic logic unit 3 in accordance with a decoding result.

The register portion 4 comprises plural status registers, a control register, a general-purpose register, logics for carrying out data writing and reading operations on these registers, etc. The arithmetic logic unit 3 executes an operation on data read out from the registers of the register portion 4 and stores the operation result into the registers.

Figure 17:
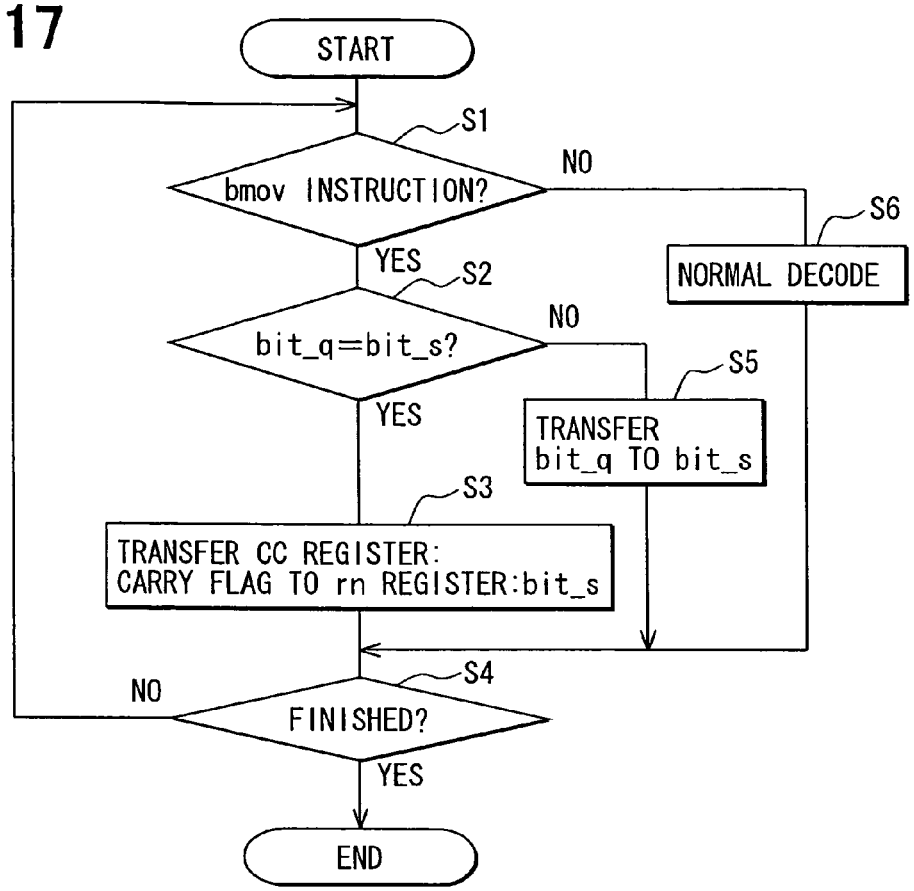
FIG. 17 is a flowchart showing the processing content of a hardware logic when an instruction fetched by the instruction decoder of CPU is decoded.

The construction of CPU 1 is not apparently different from the construction of general CPU, however, it is characterized by the processing executed when the instruction fetched by the decoder 5 is decoded. The content of the decode processing is shown in the flowchart of FIG. 17, however, this flowchart is the content executed by the internal hardware logic in the decoder 5.

Figure 16A:
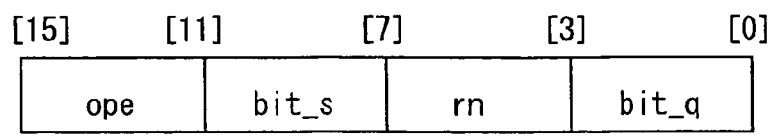
FIGS. 16A to 16C are diagrams showing a content when an instruction code coded on the basis of an instruction encoding system of a preferred embodiment is decoded and executed by CPU.
Figure 16B:
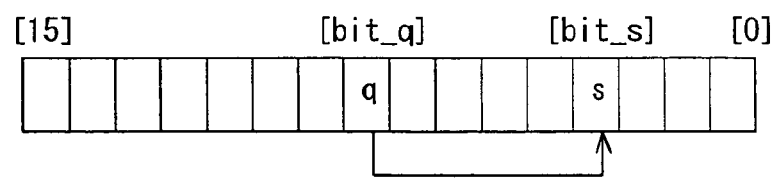
Figure 16C:
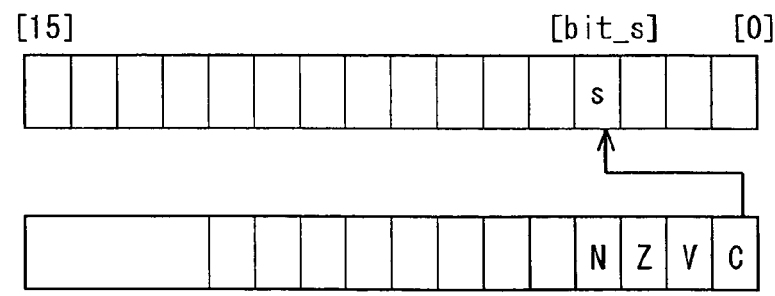

Next, the action of this embodiment will be described with reference to FIGS. 16A to 18. FIGS. 16A to 16C show a content when the CPU decodes and executes an instruction code coded on the basis of the encoding system of the present invention. FIG. 16A shows a bit transfer instruction:bmov whose code size is equal to 16 bits, and four operands each of which comprises four bits are allocated as follows.

| Bit | content |
| --- | --- |
| 15 to 12 | operation code: ope |
| 11 to 8 | operand source bit: bit_s (operation target) |
| 7 to 4 | operand register: rn |
| 3 to 0 | operand destination bit: bit_q (operation target) |

As shown in FIG. 16B, the bmov instruction normally executes the arithmetic processing of transferring the content of a source bit (for example, eight bit) to a destination bit (for example, third bit) in a general-purpose register rn indicated as an operand, that is, 1-bit operation (when bit_s≠bit_q). In this case, the decode operation of the decoder 5 corresponds to S1→S2→S5 in the flowchart shown in FIG. 17.

Accordingly, if the source bit and the destination bit are set to be identical to each other in the bmov instruction (when bit_s=bit_q), the same data are overwritten on the same bit as when the above arithmetic processing is executed, and thus the execution result does not vary. That is, the same result as when an NOP instruction is executed is achieved.

Therefore, in this embodiment, as shown in FIG. 16C, the decoder 5 of CPU 1 is designed so that the processing corresponding to an instruction different from the bmov instruction is executed when the source bit and the destination bit are set to be identical to each other in the bmov instruction.

That is, in FIG. 16C, each of the source bit and the destination bit are indicated to the third bit. In this case, the decoder 5 executes the processing of transferring the content of a carry flag [C] (another operation target whose operation result is carry or borrow) disposed in the condition code register of the register portion 4 (may be constructed as a part of CC register, status register) to the destination bit of the register rn. In the flowchart of FIG. 17, this decode operation corresponds to step S1→S2→S3. When the instruction of the decode target is an instruction other than the bmov instruction, it corresponds to step S1→S6.

Another flag [N] in the CC register means "negative" (the uppermost bit is equal to "1" from the execution result of the instruction), flag [Z] means "zero" (the execution result of the instruction is zero) and flag [V] means "overflow" (the arithmetic result is a complement of 2 and it cannot be expressed).

Figure 18:
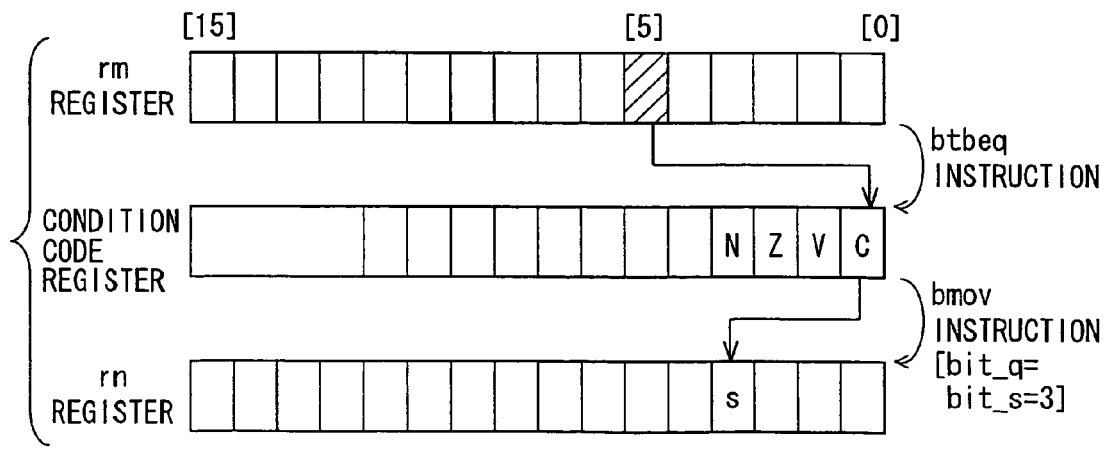
FIG. 18 is a diagram showing a case where CPU executes a program using a bmov instruction (bit_s=bit_q)
Figure 19:
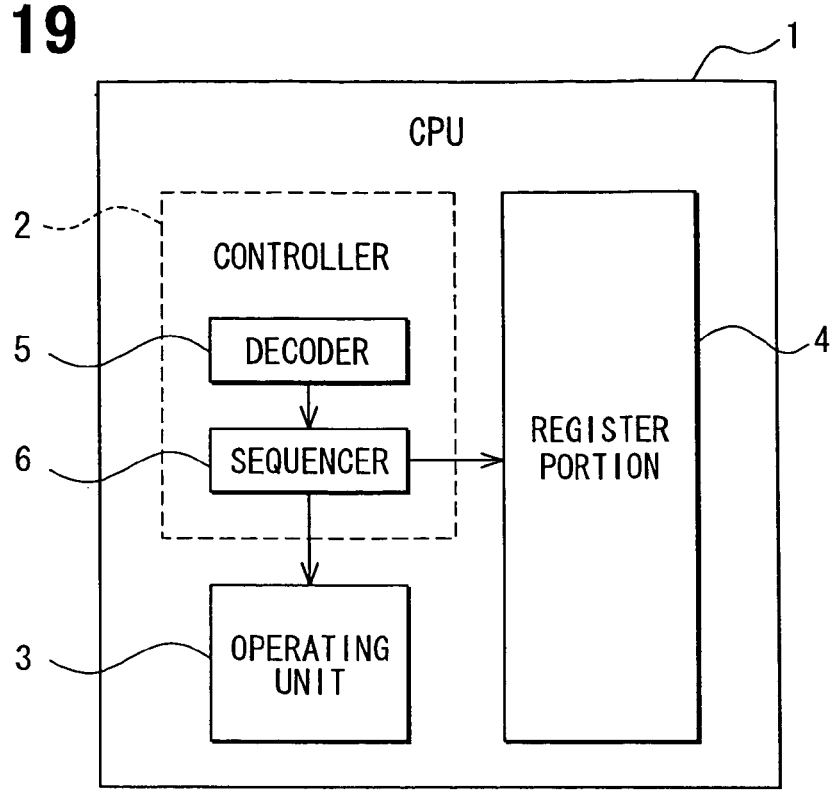
FIG. 19 is a functional block diagram showing an internal construction of the CPU.
Figure 20:
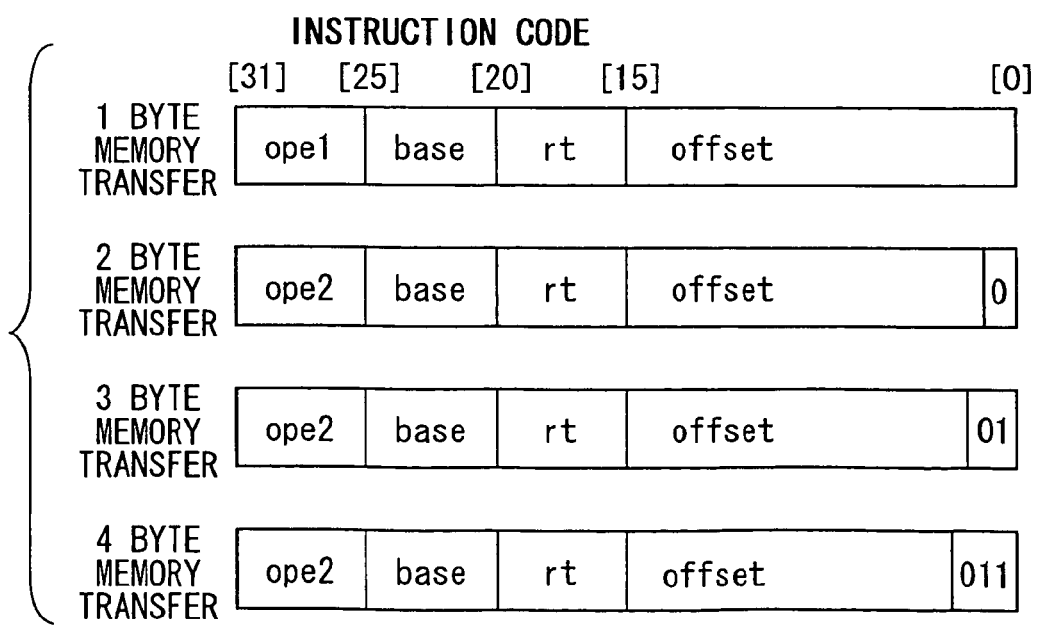
FIG. 20 is a diagram showing the construction of an instruction code according to a related art.

Here, FIG. 18 shows a specific example when CPU 1 executes a program using the above bmov instruction (bit_s=bit_q), and also shows that the content of the fifth bit of the general-purpose register rm is transferred to the third bit of the register rn. CPU 1 has a btbeq (bit test branch equal) instruction as one of instruction sets, and this btbeq instruction is assumed to be an instruction of transferring the content of any bit of any general-purpose indicated as an operand to the carry flag of the CC register.

In this case, the btbeq instruction is first executed to transfer the content of the fifth bit of the general-purpose register rm to the carry flag of the CC register, and then the bmov instruction (bit_s=bit_q=3) is executed by the same indication as shown in FIG. 16A, whereby the content of the carry flag can be transferred to the third bit of the register rn.

As described above, according to this embodiment, when operation targets indicated by plural operands in an instruction code, the decoder 5 of CPU 1 are set to a combination in which the result achieved by executing the instruction indicated by an operation code does not vary, the decoder 5 of CPU 1 executes processing corresponding to an instruction different from the above instruction. Specifically, in the bmov instruction of transferring the content of the source bit in the indicated general-purpose register rm to the destination bit, when both are indicated to the same bit, the content of the carry flag [C] disposed in the CC register is transferred to the destination bit of the register rn.

Accordingly, plural instructions can be also allocated to an instruction code in which all the operands other than the operation code are set as parameter. CPU 1 can execute more diverse instructions without increasing the number of instruction sets prepared in advance.

The present invention is not limited to only the embodiments described above or shown in the figures, and the following modifications may be made.

In the case of (bit_s=bit_q), the content of an instruction executed in place of the original 1-bit operation instruction is not limited to the above embodiment, and an instruction needed to an individual application may be suitably selected and allocated.

Furthermore, the encoding system of the present invention is not limited to the bmov command, and the same encoding system may be applied to other commands. For example, the operand for indicating an operand register is not necessarily required to the instruction code, and the instruction and the operand register may be in one-to-one relationship.

The size of the instruction code is not limited to 16 bits.

What is claimed is:

1. A microcomputer that can process plural tasks time-divisionally and in parallel, at least one of these tasks being a specific task in which a program looped so that an increment of instruction addresses is fixed is described, wherein one of the plural programs is described as a looped specific task in which the increment of program addresses is fixed, a program counter is usable as a timer counter, a peripheral function instruction for executing a peripheral function by one instruction is described in the specific task, the peripheral function instruction is set so as to indicate one or more general-purpose registers as an operand, the CPU is designed so that the peripheral function instruction can be executed as one instruction, achieves information needed to execute the instruction concerned by a general-purpose register and stores information concerning an execution result of the instruction concerned into the general-purpose registers, wherein when executing an input capture instruction as the peripheral function instruction, the CPU achieves edge indicating information of the input terminal as a condition for achieving a timer value from the general-purpose register, stores the previously sampled level of the input terminal and the present level of the input terminal into the general-purpose register, achieves a timer counter value when it is judged on the basis of the previous and present states of the input terminal that the achieved condition is satisfied, and stores the timer counter value as a capture value into the general-purpose register.

2. The microcomputer according to claim 1, wherein the CPU is equipped with a twice-coincidence filter function of storing the previous state of the input terminal and the present state of the input terminal in the general-purpose register when executing an instruction of an input processing system as the peripheral function instruction, and allowing execution of the input processing system instruction when both the values are coincident with each other.

3. The microcomputer according to claim 2, wherein the CPU is designed so that execution or non-execution of the twice-coincidence filter function can be selected in accordance with setting of a bit in the general-purpose register.

* * * * *